March 28, 1967 R. R. SCOVILLE 3,311,792

PLUG-IN CASE FOR HIGH FREQUENCY CIRCUITS

Filed June 1, 1965 2 Sheets-Sheet 1

INVENTOR

Ray R. Scoville

BY Hall, Pollock & Vande Sande

ATTORNEYS

PLUG-IN CASE FOR HIGH FREQUENCY CIRCUITS

Filed June 1, 1965

2 Sheets-Sheet 2

INVENTOR
Ray R. Scoville
BY Hall, Pollock & Vande Sande
ATTORNEYS

United States Patent Office 3,311,792
Patented Mar. 28, 1967

3,311,792
PLUG-IN CASE FOR HIGH FREQUENCY CIRCUITS

Ray R. Scoville, 5083 Commonwealth Ave., La Canada, Calif. 91011
Filed June 1, 1965, Ser. No. 460,053
10 Claims. (Cl. 317—101)

The present invention relates to casing structures adapted to be used as enclosures for electronic circuits operating at any desired frequencies; and is more particularly concerned with a pluggable module adapted to enclose I.F. type printed circuit cards in an R.F. type shield suitable for use up to about 400 megacycles.

It has become a common expedient in electronic circuit design to employ prefabricated circuits taking the form of plug-in printed cards or other types of modular circuit units. Circuits and systems constructed by known modular techniques have been found to exhibit a number of advantages and conveniences, particularly in connection with circuit assembly and disassembly, circuit servicing, testing, etc. Any particular system may constitute a plurality of plug-in printed circuit cards or other types of modules which can be removably connected as units on an appropriate supporting structure or chassis; and individual modules may be removed and replaced as desired.

Notwithstanding these known advantages of plug-in cards and module constructions, such advantages have not been readily obtainable heretofore in the high frequency range. Accordingly, modular constructions of types which have become quite prevalent at lower frequencies of operation have not been found practical, for the most part, in the higher frequency ranges. Circuit constructions utilized in high frequency applications normally require significant shielding, especially individual metallic shielding for functional blocks of circuitry; and it is also often necessary to provide ground planes in circuits operating in higher frequency ranges. Modular constructions suggested heretofore, for use with printed circuit plug-in cards, have not ordinarily provided, or been adapted to provide, such shielding or ground planes adequate for use in a circuit operating at high frequencies. As a result, such modular constructions have not been generally employed in the fabrication of circuits operating at high frequencies. These problems of known modular constructions, when intended for use at high frequencies, are complicated by the fact that there is often need for quick access to test points and adjustment controls in a particular module. Efforts to satisfy high frequency circuit requirements, such as the shielding discussed previously, have resulted in complex, relatively costly structures having limited circuit access, at best; and those high frequency modules which have been suggested heretofore, and which have incorporated provisions for adequate shielding, have not been subject to ready access for purposes of service, maintenance, and adjustment, notwithstanding their increased cost and complexity.

The present invention, recognizing the advantage of modular constructions, and simultaneously recognizing the peculiar difficulties which arise when efforts are made to use modular techniques in high frequency applications, is concerned with an improved casing and module construction of relatively simple and inexpensive construction, which provides the necessary shielding, ground planes, etc., required in high frequency usage, and which also permits ready access to any desired portion of a modular circuit.

It is accordingly an object of the present invention to provide an improved enclosure for electronic circuits operating at various frequencies between low frequencies and higher frequencies up to about 400 megacycles.

Another object of the present invention resides in the provision of a unique plug-in modular construction adapted to be used in high frequency applications.

Another object of the present invention resides in the provision of a modular construction affording ground planes and individual metallic shielding for functional blocks of circuitry, whereby the module of the present invention may be utilized at high frequencies.

A still further object of the present invention resides in an improved modular unit of pluggable nature comprising printed circuit cards associated with an RF tight shield.

Still another object of the present invention resides in the provision of a shielded modular unit so constructed that ready access may be had to circuit portions of the module for testing, adjustment, etc.

A further object of the present invention resides in the provision of an improved enclosure for circuits operating at high frequencies, so arranged that the enclosure and its encased circuits may be readily mounted upon or removed from a chassis as a unit without disturbing the circuits or the shielding thereof; and further so arranged that quick access may be had, when desired, to the interior of the shielding structure for removal, replacement, adjustment, and testing of individual circuit cards contained within the shielding enclosure.

In providing for the foregoing objects and advantages, the present invention contemplates the provision of a novel enclosure comprising a metallic frame formed as an extrusion and bent into a U configuration. The frame so provided has a ribbed interior surface providing a plurality of superposed U-shaped grooves adapted to support circuit components, and circuit cards which may be slidably inserted into and removed from the frame. The frame is further associated with metallic cover plates cooperating with the aforementioned frame to provide external shielding for the inserted circuit boards and components; and slidably insertable and removable interior conductive plates can also be provided to effect internal shields and ground plates between superposed circuit cards. The frame and its associated covers are so constructed that all joints are completely overlapping and tight throughout the construction, thereby giving excellent shielding even at very high frequencies of operation.

The enclosure is further provided with a special locking arrangement comprising elongated lock shafts extending through portions of the frame and through at least one of its associated covers whereby the modular unit may be attached to or removed from a chassis without disturbing any of the circuits or their shielding. As will appear, said locking arrangement is further so arranged that the same lock structure can be manipulated to permit removal of at least one cover from the shielding module, without otherwise removing a module from the chassis, thereby to permit access to circuits within the enclosure for purposes of adjustment and testing while the modular circuit is in actual operation.

The foregoing objects, advantages, construction and operation of the present invention will become more readily apparent from the following description and accompanying drawings, in which.

Figure 1:
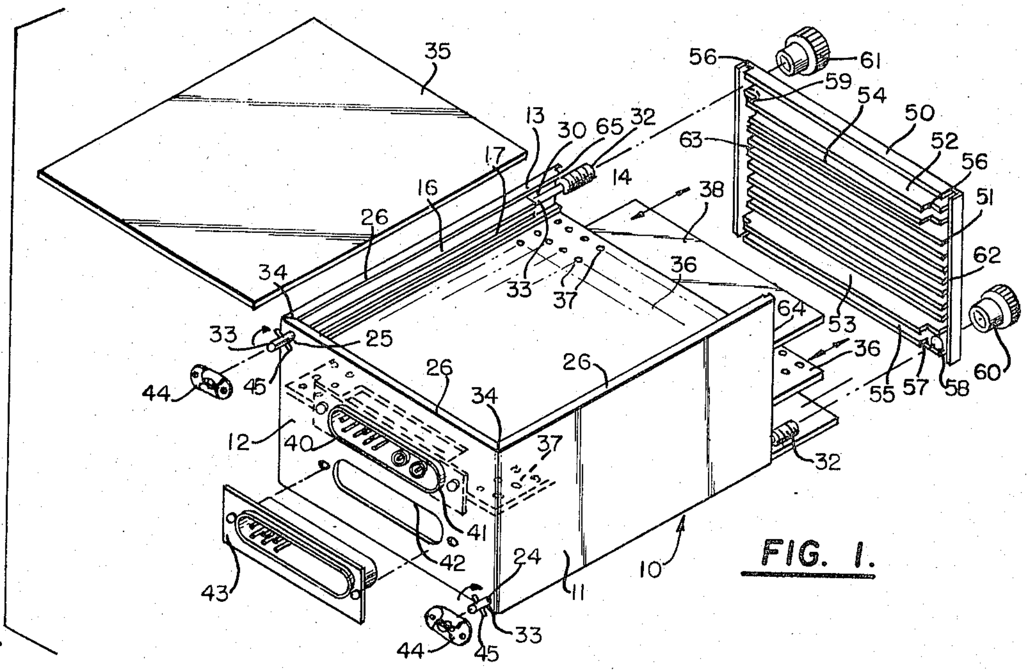
FIGURE 1 is an exploded perspective view showing an improved module constructed in accordance with the present invention.

Referring first to FIGURES 1 and 2A through 2C inclusive, it will be seen that a module constructed in accordance with the present invention may comprise a housing consisting of a U-shaped frame 10 associated with side and end covers of conductive material forming overlapping joints throughout. The U-shaped frame 10 is fabricated from an elongated extruded metallic plate (see FIGURE 2A and FIGURE 2B) which is demarcated into three sections 11, 12 and 13. The exterior surface of the plate, as is best shown in FIGURE 1, has a satin-finish for best appearance, and exhibits a smooth, unbroken surface (except, as will appear, for the provision of apertures through which electrical connectors and lock shafts may protrude).

Figures 2A, 2B, 2C:
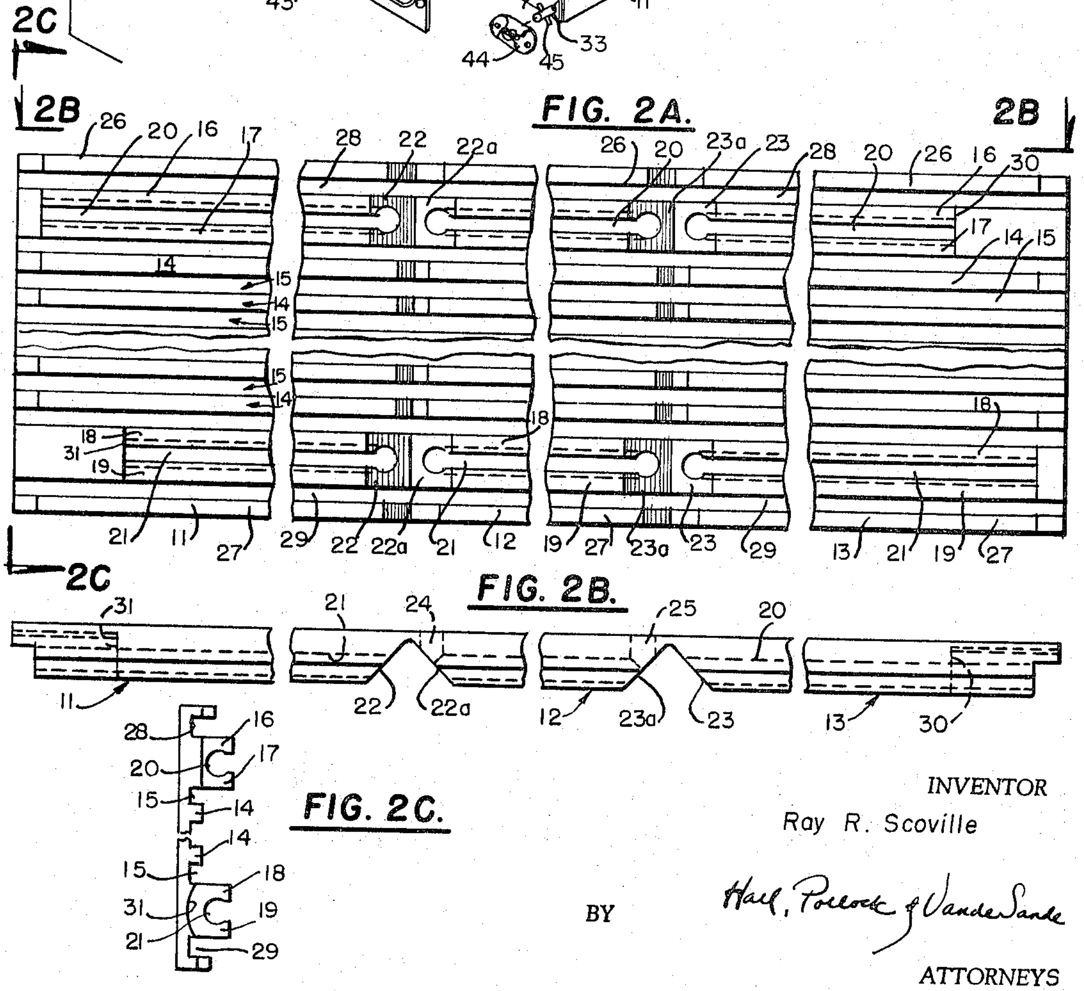
FIGURE 2A is a plan view, partially broken, of a metallic extrusion which may be bent to form the basic frame of my improved module.
FIGURE 2B is a view taken on line 2B—2B of FIGURE 2A.
FIGURE 2C is an end view of the extrusion taken on line 2C—2C of FIGURE 2A.

The interior surface of the extruded plate is of ribbed configuration, and includes a plurality of elongated outstanding ribs 14 spaced from one another to provide intervening elongated groves 15. As is best shown in FIGURE 2A, the ribs and intervening grooves in each of the sections 11, 12 and 13 are disposed in aligned relation to one another. Accordingly, when the extrusion of FIGURE 2A is bent into a U shaped configuration, as will appear, each of the ribs 14 in section 11 firmly abut like such ribs 14 in the section 12, and the ribs 14 in section 12 similarly firmly abut corresponding ribs in section 13. This disposition of ribs and grooves thus results in the formation of a plurality of U-shaped grooves within the frame 10, after the extruded plate of FIGURE 2A is bent in the manner to be described, with these U-shaped grooves being disposed in superposed relation to one another and being adapted to slidably receive planar members such as circuit cards or conductive structures acting as ground planes or interior shields.

In addition to the ribs 14 and their intervening grooves 15, the extrusion shown in FIGURE 2A includes, on its interior surface, further pairs of ribs 16, 17 and 18, 19 disposed outside of the ribs 14 and grooves 15. As is best illustrated in FIGURE 2C, these further ribs 16, 17 and 18, 19 are outstanding from the interior surface of the extrusion by a dimension greater than that of the several ribs 14. Moreover, the outermost end of the ribs 16, 17 and 18, 19 include inwardly facing lips which serve to define, with their associated ribs, bracket ducts 20 and 21 positioned respectively adjacent the upper and lower elongated extremities of the extrusion. The ribs 16, 17 and 18, 19 in each of the sections 11, 12 and 13 have corresponding such ribs in the others of the sections, whereby firm abutment between the said ribs 16, 17 and 18, 19 is effected once the extrusion is bent, as in the case of the several ribs 14. The resulting elongated bracket ducts 20 and 21, formed about the exterior of the frame are adapted to receive elongated lock shafts (to be described), and are also adapted to receive appropriate fittings for mounting other electrical components within the frame 10, such as may be desired.

The several sections 11, 12, and 13 of the extrusion are demarcated from one another by a pair of V-shaped grooves extending transverse to the several ribs and having mitred edges 22, **22*a*, and 23, 23*a*, respectively (see FIGURE 2B). The mitred edges in each of said V-shaped grooves are preferably disposed at substantially 90° to one another in the original extrusion. In addition, the central portion 12 of the extrusion is provided with a pair of apertures 24 and 25 which extend from the outermost smooth face of the extrusion, opening into the V-groove edges 22*a* and 23*a*, respectively, at diagonally opposite corners of the extrusion section 12. The overall arrangement is, accordingly, such that the sections 11 and 13 may be bent about the junctions between V-groove edges 22, 22*a*, and V-groove edges 23, 23*a*, into substantially parallel relation to one another and at substantially 90° to the direction of extension of the extrusion section 12. By such a bending process, the extrusion of FIGURES 2A and 2B is given a U-shaped configuration with edges 22 and 22*a* in firm abutment, as is the case with edges 23 and 23*a*. In addition, when the extrusion is so bent, the bracket duct 21 is brought into alignment with aperture 24, and the bracket duct 20 is brought into alignment with aperture 25, so that a continuous elongated duct is provided adjacent diagonally opposite sides of the resulting U-shaped frame (comprising frame 10 of FIGURE 1), which ducts extend through the intermediate frame section 12** adjacent diagonally opposite corners thereof (see FIGURE 1).

The uppermost and lowermost edges of the extension shown in FIGURES 2A–2C define inwardly extending flanges 26 and 27 which are separated from one another, in the several sections, by the aforementioned V-groove mitred edges 22, **22*a* and 23, 23*a*. When the frame is bent in the U-shaped configuration described previously, the several flanges 26 are also brought into firm engagement with one another to provide tight joints at the frame corners 34 (see FIGURE 1). The flanges 26, 27 are spaced, as illustrated, from the adjacent ribs forming the aforementioned bracket ducts, and define grooves 28 and 29 (see FIGURE 2C) extending continuously about the upper and lower edges of the U-shaped frame, and adapted to slidably receive metallic cover members. In addition to the foregoing features of the extrusion, the bracket ducts 20 and 21 are cut away adjacent diagonally opposed corners of the frame, as at 30 and 31, to provide seats for threaded portions 32 of elongated lock shafts 33**, to be described more fully hereinafter.

The frame 10, formed when the extrusion of FIGURES 2A through 2C is bent into the aforementioned U-shaped configuration, is adapted to receive, in its various internal groovse and ducts, a plurality of components and fittings. More particularly, the upper and lower sides of the frame (as viewed in FIGURE 1) may slidably receive metallic side covers, one of which has been designated 35. These side covers are slid into the grooves 28 and 29 described previously; and when they are so situated in the frame, the upper and lower flanges 26 and 27 of the frame 10 are in close engagement with and disposed in overlying relation to the peripheral edges of the cover 35, thereby achieving an RF tight joint all along the cover edges. Since the outermost surface of the U-shaped frame is not broken at its corners, the resulting casing is RF tight throughout the region of its three sides 11, 12, and 13, and the adjacent covers 35.

The interior grooves 15, provided by the previously described ribs 14, are also adapted to slidably receive circuit boards or cards such as are designated 36. The circuit cards 36 comprise an insulating material and are preferably perforated at a number of locations such as 37 to facilitate the mounting of components and wiring. If desired, one or both sides of the circuit card 36 may be copper clad to make provision for the etching of printed circuits directly on the cards, or to permit various ground planes and pads to be formed on the card by the selective removal of portions of the copper cladding. These and other aspects of the cards 36 do not in themselves comprise a portion of the present invention since they constitute techniques and structures well known to persons skilled in the printed circuit art; and it must, therefore, be understood that, in this respect, any appropriate circuit card or printed circuit configuration can be employed at the locations noted for cards 36.

A plurality of cards 36 may be slidably disposed within the frame structure at different desired levels; and these cards may be relocated as is needed, or may be removed or replaced. In those instances where it is desirable to provide shielding between different ones of the circuit cards 36, a conductive plate 38 can also be slidably inserted along appropriate grooves 15 at positions between the cards 36 to be so isolated or shielded from one another. The conductive plate 38 makes good electrical contact with the outer frame 10 in the region of the sides and base of each groove 15; and one or more of such conductive plates 38 can be appropriately positioned as desired within the overall module to effect appropriate isolation between different circuits. It should be noted that the plate 38, rather than comprising a completely metallic plate, can take the form of an insulating board having copper cladding on one or both surfaces thereof. One side of the board, forming plate 38, can be uniformly coated with copper cladding to effect the desired ground plane or shield structure; and the other side of this same board 38 can be employed to carry printed circuits, or any other components which may be desired.

One or more of the circuit cards 36 may be associated with electrical plugs or connectors such as 40. Each connector 40 can be attached directly to an edge of a circuit card 36 so as to form a unitary portion of the overall circuit comprised by the card. The end portion 12 of frame 10 includes one or more apertures such as 41, 42 through which such connectors 40 may protrude from the interior of the frame; and for purposes of clarity, a typical such connector 40 has been shown in such protruding relation adjacent aperture 41, with the connector adjacent aperture 42 being omitted in the drawing. Portions of conectors 40 overlap and are closely complementary to edges of apertures 41 and 42 in shape and size to provide an RF tight junction between the connectors and frame when connectors 40 protrude through apertures such as 41 and 42. Moreover, the aperture and connector shapes are preferably non-symmetrical about a center line, or include appropriate key structures, to assure that the connectors (and circuit boards) are inserted in a proper orientation relative to the frame, rather than upside down. Thus, each separate circuit card may be pluggably inserted or removed, or the entire housing may be plugged in or out.

Connectors 40 may include separately shielded coaxial elements as well as standard plug pins. It should further be noted that the pluggable connectors 40 may, if desired, be mounted directly upon the end 12 of the frame 10 rather than being carried by the circuit cards 36 themselves; and, indeed, such connectors or miniature plugs 40 may be carried by the end cover 50 (to be described), i.e., the pluggable connectors may be associated with a removable part of the housing rather than with a fixed portion thereof.

The provision of plugs such as 40 makes the overall module pluggable in nature, whereby the module can be readily electrically connected to or disconnected from a main chassis (not shown). To provide for such pluggable connection and disconnection, the chassis with which the module is associated may have further plug units 43 mounted thereon which are complementary to the particular plugs 40 selected for use with the module. In addition, the chassis preferably has pairs of slotted fittings or lock fastening brackets 44 mounted thereon and adapted to receive the end of lock shafts 33 which protrude through end face 12 of the housing. These protruding ends of the lock shafts 33 include pins or detents 45 which can be extended through slotted apertures in lock fastening brackets 44 whereby, upon effecting a quarter turn in the lock shafts 33, the lock shafts and the overall module associated therewith are mechanically attached to the chassis by means other than the electrical plugs. It should be noted that, in many applications, the connector and bracket parts 43, 44 are mounted on a horizontal chassis surface, and the end 12 of the module actually forms the bottom surface of the module, whereby the overall assembly, when mechanically and electrically connected to the chassis is turned through 90° from the representation of FIGURE 1.

The end of the module opposite to end 12 (which may be the uppermost end of the overall module when it is mounted in the manner described) is provided with an end cover 50, formed as an extrusion to define a plurality of grooves and bracket ducts on its inner surface essentially similar to those described in reference to the main frame 10. More particularly, the end cover 50 includes a plurality of ribs 51 which mate with the ribs 14 described previously; and these ribs 51 define intervening grooves mating with grooves 15 and adapted to receive the outermost end of the several circuit cards 36, shield and ground plates 38, etc. The end cover 50 further includes rib pairs 52 and 53 forming further ducts 54, 55 which are located at the same levels as bracket ducts 20 and 21 described earlier. These further bracket ducts 54, 55, in the end cover 50, can receive additional fittings such as corner brackets to be described hereinafter in reference to FIGURE 6. In the alternative, the bracket ducts 54, 55 may be used to mount other components within the shielded enclosure, as is the case with bracket ducts 20 and 21.

The ribs 52, 53 are cut away at their opposing ends, as illustrated at 56, 57 (see FIGURES 1 and 4) so as to avoid interference between said ribs and the lock shafts mentioned earlier. In addition, diagonally opposite corners of the end cover 50 are provided with apertures 58 and 59, through which the threaded portions 32 of the lock shafts may pass. As a result, the threaded portions 32 of said lock shafts may be engaged by external thumb screws 60, 61, adapted to retain the overall structure in assembled configuration.

Figure 5:
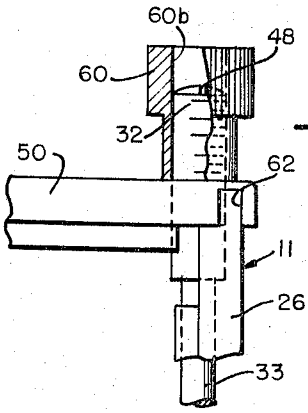
FIGURE 5 is a cross-sectional view of the lock structures shown in FIGURE 4, illustrating the relationship of certain parts when assembled.

The interior surface of end cover 50 is rabbeted to provide a pair of elongated grooves 62 and 63 adapted to receive the outermost edges 64 and 65 of the frame side portions 11 and 13. In adidtion, as is best illustrated in FIGURES 1 and 5, the upper and lower edges of the end cover 50 are formed with inwardly extending flanges corresponding to the frame flanges 26 and 27 already described. When side covers 35 and the end cover 50 are mounted in place, therefore, all four edges of each side cover 35 are overlapped by adjacent flange portions of the frame 10 and end cover 50. Moreover, with the parts so assembled, the edges 64 and 65 of the frame 10 are recessed within the grooves 62 and 63 of the end cover 50 to provide still further overlap along the side edges of the frame. The overall assembled structure thus exhibits overlapping joints throughout, thereby giving the structure excellent shielding characteristics.

Figure 3:
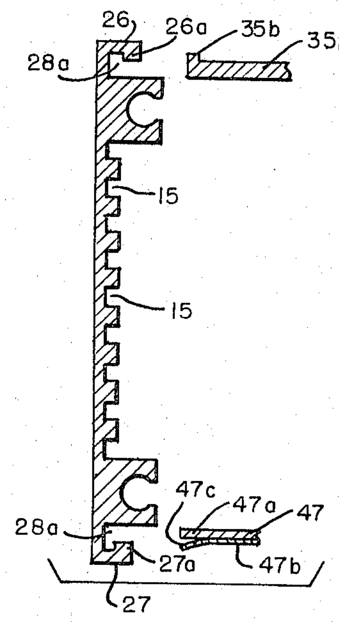
FIGURE 3 is a cross-sectional end view of an extrusion, generally similar to FIGURE 2C, illustrating certain modifications which may be made in the structure of the present invention.

The particular frame groove configuration previously described with reference to FIGURES 1 and 2, is subject to certain modification, as is the edge configurations of the several circuit boards and covers which may be associated with the frame 10. Referring to FIGURE 3, for example, it will be noted that the upper and lower flanges 26 and 27 of the extrusion used to form the main frame 10 can be provided with inwardly extending lips 26*a* and 27*a*. This gives the interiors of the resulting peripheral grooves a keyed cross-section. Such grooves, designated 28*a* in FIGURE 3, can be associated with one or more side cover members such as 35*a*, each of which is provided with upstanding lips 35*b* adjacent its opposing elongated edges.

When the edges of any such cover member 35*a* are slid into key-type grooves 28*a* on opposed frame sections such as 11 and 13, the cover member inhibits spreading of the frame sections 11 and 13 away from one another, and simultaneously assures that the corners 34 of the frame are maintained in firm engagement with one another. In this respect, it might be noted that since the frame structure 10 previously described in reference to FIGURES 1 and 2 is formed of metal, and is bent into a U-shaped configuration, there may be some latent resiliency at the corners of the frame which may permit the frame to spread somewhat when the end cover 50 is removed; and in some circumstances, this may cause one or more circuit board edge to shift out of a supporting groove within the frame. Such frame spreading is positively inhibited by the modified side cover arrangement 35*a*, 35*b* associated with the modified groove 28*a*; and so long as at least one side cover member is in place, the overall module maintains its desired dimensions even though the end cover 50 is removed for purposes of servicing, testing, or replacing circuits within the module.

It will be appreciated, of course, that a keyed configuration of the type shown in respect to groove 28*a* may also be provided with respect to any or all of the circuit card grooves 15. In such an event, the edges of one or more circuit cards 36 or one or more shield plates 38 can be provided with a locking structure similar to the lip 35*b*, thereby achieving substantially the same results through the use of circuit cards or shield plates, rather than side covers.

When it is desired to use one or more circuit cards and/or one or more covers for effecting a locking of the frame in the manner described, other forms of cover, card, or shield plate configurations can be employed. One such further modification is illustrated in FIGURE 3 with respect to a side cover 47. This modified form of cover includes a relatively thick base portion 47*a* upon which is mounted, e.g., by an appropriate adhesive, a layer of thin springy material 47*b*. No adhesive is provided adjacent the outermost edge of the composite structure, e.g., in the region 47*c*, whereby a portion of the springy layer 47*b* stands away from base portions 47*a* to provide the overall cover with a resilient edge. It will be appreciated by examination of FIGURE 3 that such a cover, when inserted into a groove such as 28*a*, will achieve a pressure seal between cover and frame thus providing better shielding for high frequency waves.

Figure 4:
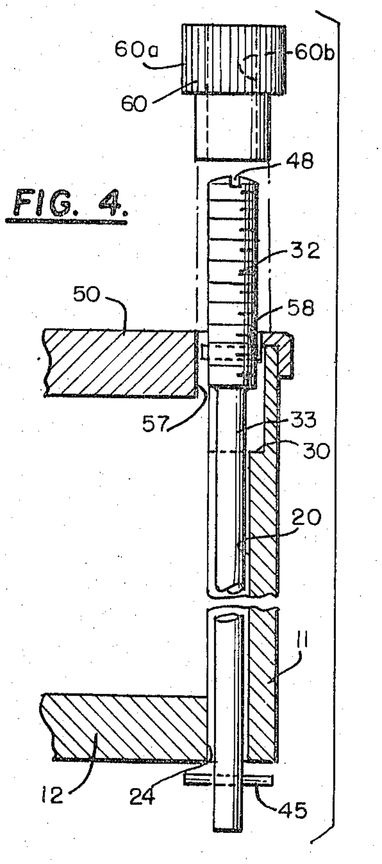
FIGURE 4 is an exploded cross-sectional detail view illustrating the improved locking structure of the present invention.

FIGURES 4 and 5 better illustrate certain of the details of the lock shaft structure previously described in reference to FIGURE 1. More particularly, the lock shaft comprises an elongated rod 33 extending through a bracket duct such as 20 and protruding through an aperture such as 24 provided in the end section 12 of frame 10. The lowermost end of the rod 33 is provided with a pin 45 which extends in a direction transverse to the direction of elongation of the lock shaft 33, and which is of sufficient dimension to prevent the lock shaft from being completely withdrawn in an upward direction from the bracket duct 20. The upper end of the lock shaft is formed with an enlarged threaded portion 32 which cooperates with the aforementioned seat 30, so as to prevent the lock shaft 33 from being withdrawn from bracket duct 20 in a downward direction. As a result, the overall lock shaft is retained within bracket duct 20 but is adapted to exhibit some vertical play.

The pin 45 provided at the lowermost end of the lock shaft is intended to cooperate with fixed slotted chassis lock fastener bracket members such as 44 described earlier; and, when the lock shaft 33 is extended through an appropriate bracket 44 so that pin 45 thereof protrudes beyond the slotted facing of lock fastener bracket 44, the lock shaft may be given a one-quarter turn so as to lock the shaft 33, and thereby the overall module, in place. To provide for such turning of the lock shaft, the uppermost end of threaded portion 32 is provided with a driver slot 48 into which a screw driver may be inserted to effect the desired turning of the overall lock shaft.

The threaded portion 32 of the lock shaft is adapted to receive a thumb screw 60 (or 61). A typical such thumb screw 60 is illustrated in FIGURES 4 and 5; and it includes a knurled portion 60*a* on its exterior surface, and further includes an inner threaded bore 60*b* extending completely through the thumb screw. When the thumb screw 60 is in thread engagement with the threaded portion 32 of the lock shaft, the said thumb screw may be turned down into firm abutment with the outer surface of end cover 50, in the manner illustrated in FIGURE 5. With the thumb screw so disposed, the cover 50 is held in firm engagement with the frame 10 of the module as well as with the covers 35, plates 38, and circuit boards 36 associated with the module frame. At the same time, as is best apparent from FIGURE 5, the driver slot 48 of threaded portion 32 is accessible through the bore 60*b* of thumb screw 60 whereby the desired turning of lock shaft 33 can be achieved by inserting a screw driver through thumb screw bore 60*b* into engagement with driver slot 48.

It will be appreciated from FIGURES 1, 4, and 5 that once the thumb screws, such as 60 and 61, are turned into place the overall housing is an RF tight, unitary structure having overlapping joints throughout. This unitary enclosure, and the circuit module which it comprises, can be locked into place or removed from a chassis by manipulating lock shaft 33 through the bore 60*b* of the thumb screw 60 without disturbing the unitary nature of the module and without requiring that any portions of the module enclosure be removed. By the same token, it will be seen that the lock shaft and end cover arrangement permits end cover 50 to be removed from the housing by unscrewing thumb screws 60 and 61, without disturbing or turning lock shaft 33. As a result, access may be had to the interior of the housing while it is locked to the chassis with the circuit in operation. This particular lock shaft structure has considerable advantages in actual practice since the module can be removed or mounted as a unit without disturbing the encased circuits, and since the circuit can also be tested, adjusted, etc., without removing the same from the chassis.

Figure 6:
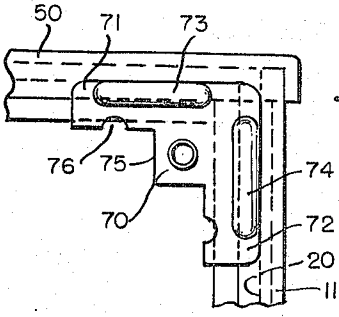
FIGURE 6 is a detail view of an interior corner of a module constructed in accordance with the present invention, illustrating an optional corner bracket which may be employed when desired.

The structure described in reference to FIGURES 4 and 5 corresponds, of course, to structures present at two diagonally opposed corners of the module (see FIGURE 1). The other two corners of the module need not be associated with any special locking structures, since two diagonally opposed locks are ordinarily more than adequate to achieve necessary mechanical rigidity and RF tightness in the module. However, in some circumstances, it may be desirable to provide extra fittings or corner brackets at the two corners of the module which do not have lock shafts therein; and FIGURE 6 shows one possible arrangement providing such additional corner engagement. More particularly, it will be appreciated that the bracket ducts 20, 21 extend continuously about the upper and lower extremities of the module frame 10, as well as along the upper and lower edges of the end cover 50. In the arrangement of FIGURE 1, a first lock shaft is positioned to protrude through aperture 58 adjacent one end of bracket duct 55 in end cover 50; but no lock shaft or other locking structure is provided adjacent the corresponding end of the bracket duct 54 directly above aperture 58. A similar situation prevails at the other edge of end cover 50. The unused portions of the bracket ducts 20, 21, 54, and 55, diagonally opposite the two lock shafts shown in FIGURE 1, can be provided with resilient corner brackets of the type shown in FIGURE 6.

The corner brackets are designated 70, and comprise a pair of legs 71, 72 extending at substantially right angles to one another. Each of said legs 71 and 72 is provided with a bulged elongated dimple such as 73 and 74, which preferably has an outer semi-circular configuration. Corner bracket leg 71 may be slipped into one end of a bracket duct in end cover 50 opposite the aperture 59 (see FIGURE 1) whereby the dimple 73 frictionally engages the inner surfaces of bracket duct 54 to keep the corner bracket 70 in place. When the corner bracket is so inserted, the leg 72 protrudes outwardly at right angles to the plane of cover 50; and this leg 72 may then be slid into the end of bracket duct 20 provided in frame portion 11. The bulged dimple 74 again effects internal frictional engagement with the walls of bracket duct 20 to keep the corner bracket in place adjacent said duct 20.

The legs 71 and 72 may be manually bent into a somewhat arcuate configuration to increase the gripping force between the corner bracket legs and their associated bracket ducts. A similar such corner bracket may, of course, be provided adjacent the diagonally opposite portion of the structure. As a result, two diagonally opposite edges of the overall module will be associated with lock shafts such as have been described, while the other two diagonally opposite edges of the structure can have resilient slidably insertable and removable corner brackets of the type shown in FIGURE 6.

When resilient, slidable corner brackets of the type shown in FIGURE 6 are employed, each said corner bracket may be provided with a threaded aperture 75; and components may, accordingly, be mounted on the corner bracket 70 itself. In the alternative, if it is desirable in a particular circuit configuration, a cover such as 35 or a circuit board such as 36 can be attached to the corner bracket 70 by means of the threaded aperture 75. In addition, the corner brackets 70 may be provided with edge depressions such as 76. Once the corner brackets 70 are properly positioned in the bracket ducts of end cover 50, a portion of the end cover ribs 54 and 55 can be manually deformed, e.g., by a center punch, to protrude into said depressions 76 thereby to lock the corner brackets in place relative to end cover 50. This still permits the end cover to be attached or removed as desired, but prevents the corner brackets from shifting in position relative to end cover 50 when the end cover is removed.

While I have thus described preferred embodiments of the present invention, many variations will be suggested to those skilled in the art, and certain of these variations have, in fact, already been discussed. It must, therefore, be understood that the foregoing description is intended to be illustrative only, and should not be considered limitative of my invention; and all such variations and modifications as are in accord with the principles described are meant to fall within the scope of the appended claims.

Having thus described my invention, I claim:

1. A shielded enclosure for use with high frequency electronic circuits comprising a conductive U-shaped frame having first, second, and third rectangular planar sides integral with one another, said first and third sides being disposed in generally parallel planar relationship to one another and being spaced from one another by said second side, each of said first, second, and third sides having a ribbed interior surface defining a plurality of superposed U-shaped grooves adapted to slidably receive and support rectangular circuit boards along three edges of each said board, said second side including means for receiving plug-type connectors electrically coupled to circuits on said circuit boards, a pair of conductive side covers adapted to be slidably inserted into spaced ones of said U-shaped grooves adjacent the spaced opposing edges of said U-shaped frame, said side covers extending in planes transverse to the planes of each of said first, second, and third sides, the spaced opposing edges of said U-shaped frame including flange means overlying edges of said side covers to provide RF tight junctions between said frame and said slidable side covers, a removable end cover positioned on said first and third sides in a direction generally parallel to said second side, said end cover including an interior surface defining recessed first grooves adapted to receive the free ends of said first and third sides and of said pair of side covers to form RF tight junctions therewith, the interior surface of said end cover further including means defining second grooves adapted to receive the fourth edge of each rectangular circuit board inserted in the grooves of said frame, and elongated lock shaftss extending from said end cover through said frame and protruding through apertures in said second side to positions exterior of said frame, said lock shafts including detent means adjacent the exterior surface of said second side adapted to removably engage a supporting structure upon which said shielded enclosure is to be mounted, said lock shafts further including first means adjacent said end cover adapted to removably hold said end cover in engagement with said frame, circuit boards, and side covers, and said lock shafts also including second means adjacent said end cover for manipulating said detent means to effect selective mechanical locking engagement and disengagement of said enclosure relative to said supporting structure.

2. The combination of claim 1 wherein said frame is formed from an elongated rectangular plate having an unbroken exterior surface and also having a plurality of elongated parallel extruded ribs outstanding from its interior surface and extending in the direction of elongation of said plate to form the ribbed interior surface of said first, second and third sides, the extruded ribs on the interior surface of said plate being interrupted by a pair of elongated V-shaped notches extending across the interior surface of said plate in directions transverse to the direction of elongation of said plate, said V-shaped notches demarcating said first, second, and third sides from one another, said plate being bent at each of said notches to bring portions of said ribs interrupted by said notches into engagement with another.

3. The combination of claim 1 wherein each of said lock shafts include a threaded head disposed adjacent said end cover and adapted to protrude via an aperture in said end cover to the exterior side of said end cover, said first means comprising a thumb screw adapted to thread engage said threaded head adjacent the exterior side of said end cover, said thumb screw including an axial central bore exposing a portion of said threaded head when said thumb screw is in engagement with said head, said second means comprising a tool-engageable abutment on said exposed portion of said threaded head.

4. The combination of claim 1 wherein the ribbed interior surface of said first and third sides define elongated ducts for supporting said lock shafts within said frame, the apertures in said second side of said frame communicating with said ducts.

5. The combination of claim 4 wherein said ducts are disposed adjacent diagonally opposed sides of said frame, there being a pair of diagonally opposed lock shafts supported by said ducts respectively.

6. The combination of claim 1 wherein said plug-type connectors are mechanically attached to said circuit boards for physical movement with said boards, said second side of said frame including aperture means for exposing said connectors when said circuit boards are supported on said U-shaped grooves.

7. The combination of claim 1 wherein at least some of said U-shaped grooves include lip means for positively engaging the edges of at least one of said side covers.

8. The combination of claim 1 including a conductive plate slidably supported on one of said U-shaped grooves at a location between a pair of said slidably supported circuit boards for shielding the circuits on said pair of circuit boards from one another.

9. A housing for electronic circuits comprising a conductive frame member of closed configuration having a ribbed interior surface defining a plurality of superposed grooves slidably receiving and supporting circuit boards, at least one side of said frame member having plug-type electrical connectors coupled to circuits on said circuit boards, a plurality of conductive plate member slidably inserted into spaced ones of said grooves in spaced parallel relation to said boards for shielding the circuits on said boards from one another and from regions exterior of said housing, at least one side of said frame member comprising a removable end plate positioned in a plane transverse to the planes of said circuit boards and of said plate members, said removable end plate including grooves receiving edges of said circuit boards and of said plate memberss, and elongated lock shafts extending through said frame member and protruding through apertures in a pair of opposing sides of said frame member, said lock shafts including detent means adjacent the exterior of one of said opposing sides adapted to removably engage a supporting structure upon which said housing is to be mounted, said lock shafts further including means adjacent the exterior of the other of said opposing sides for manipulating said detent means to effect locking engagement and disengagement of said housing from said supporting structure.

10. A shielded enclosure for use with high frequency electronic circuits comprising a conductive U-shaped frame member having an interior surface defining a plurality of superposed U-shaped grooves slidably receiving circuit boards, a plug-type connector electrically connected to a circuit on at least one of said circuit boards and protruding via an aperture in said frame member to the exterior of said frame member, a pair of conductive side covers slidably inserted into spaced ones of said U-shaped grooves at positions outside of said circuit boards, said side covers being in electrical contact with said U-shaped frame member, a removable conductive end cover positioned in a plane transverse to the planes of said circuit boards and of said side covers, said end cover including grooves overlying and in electrical contact with the free ends of said side covers and of said frame member whereby said end cover, side covers, and frame member define an enclosed conductive housing for shielding said circuit boards, and at least one elongated lock shaft extending from the exterior side of said end cover through said frame member and protruding through an aperture in a side of said frame member opposite to said end cover, said lock shaft including detent means adjacent one end thereof adapted to removably engage a supporting structure upon which said enclosure is to be mounted, and said lock shaft also including means adjacent the other end thereof adapted to permit manipulation of said detent means to effect locking engagement and disengagement of said enclosure from said supporting structure.

References Cited by the Examiner

UNITED STATES PATENTS

| | | | |
|---|---|---|---|
| 2,160,653 | 5/1939 | Green et al. | 312—265 |
| 2,827,507 | 3/1959 | Anderson | 174—52 |
| 3,265,935 | 8/1966 | Rosa | 317—101 |

ROBERT K. SCHAEFER, *Primary Examiner.*

M. GINSBURG, *Assistant Examiner.*